(12) United States Patent
Knecht et al.

(10) Patent No.: US 6,709,211 B1
(45) Date of Patent: Mar. 23, 2004

(54) GIRT OR PURLIN RETAINER AND METHOD OF USING SAME

(75) Inventors: Darwin P. Knecht, Wood River, NE (US); David R. Bergholz, Grand Island, NE (US)

(73) Assignee: Chief Industries, Inc., Grand Island, NE (US)

( * ) Notice: Subject to any disclaimer, the term of this patent is extended or adjusted under 35 U.S.C. 154(b) by 14 days.

(21) Appl. No.: 10/191,038

(22) Filed: Jul. 3, 2002

(51) Int. Cl.[7] ............................ F16B 35/06; F16B 39/00
(52) U.S. Cl. ........................... 411/176; 411/9; 411/186; 411/399
(58) Field of Search ................. 411/84, 85, 169, 411/186–189, 176, 399, 2, 9

(56) References Cited

U.S. PATENT DOCUMENTS

| | | | |
|---|---|---|---|
| 2,527,616 A | * 10/1950 | Beckstrom | 411/399 X |
| 3,056,443 A | * 10/1962 | Knocke | 411/186 |
| 3,222,975 A | 12/1965 | Scott | |
| 3,651,734 A | 3/1972 | McSherry | |
| 3,834,269 A | 9/1974 | Ohringer | |
| 4,293,256 A | * 10/1981 | Pamer | 411/187 X |
| 4,348,141 A | 9/1982 | Dahl | |
| 4,350,465 A | 9/1982 | Lovisek | |
| 4,498,825 A | 2/1985 | Pamer et al. | |
| 4,907,923 A | * 3/1990 | McGrath, Jr. | 411/85 X |
| 5,120,168 A | 6/1992 | Padula | |
| 5,787,794 A | * 8/1998 | Plantan et al. | 411/186 X |
| D413,059 S | 8/1999 | Dell et al. | |
| 6,007,287 A | 12/1999 | Toosky et al. | |
| 6,052,274 A | 4/2000 | Remsburg | |
| 6,296,429 B1 | 10/2001 | Wright | |

OTHER PUBLICATIONS

OSHA Rules—Subpart R–Steel Erection, printed Jun. 6, 2001.

* cited by examiner

*Primary Examiner*—Neill Wilson
(74) *Attorney, Agent, or Firm*—Thomte, Mazour & Niebergall; Dennis L. Thomte

(57) ABSTRACT

A girt retainer is described for temporarily securing one end of a girt to a column clip until a second girt has been secured to the first girt and the column clip. The girt retainer comprises a threaded shank having a deformable, disk-shaped head mounted thereon. The head has at least one anti-rotation protrusion extending downwardly therefrom. The method of utilizing the girt retainer to temporarily secure one end of a girt to a column clip is also described. The retainer may also be used as a purlin connector or as a connector for connecting the overlapping ends of two elongated members.

10 Claims, 6 Drawing Sheets

GIRT OR PURLIN RETAINER AND METHOD OF USING SAME

BACKGROUND OF THE INVENTION

1. Field of the Invention

This invention relates to a girt or purlin retainer and the method of using the same and more particularly to a method of bolting the overlapping ends of first and second girts or purlins, which share common connection holes, to a clip which is secured to a frame.

2. Description of the Related Art

The ordinarily accepted definition of a systems-engineered metal building is a metal, field-assembled building system consisting of framing, roof and wall coverings. The framing normally consists of horizontally spaced-apart metal columns or frame members having metal frame members extending from the upper ends thereof for supporting the roof of the structure. Girts are "Z" or "C"-shaped members formed from sheet steel which span between the columns and which may support wall material. Purlins are "Z" or "C"-shaped members formed from sheet steel which span between the primary framing and the supporting roof material. Each of the columns normally has a plurality of vertically spaced clips secured thereto which extend substantially horizontally inwardly therefrom for connection to the girts to support the same. Inasmuch as the length of the girts is substantially less than the length of the building, the girts must be overlapped and secured together with such overlapping normally occurring adjacent a column. The overlapped ends of the girts have connection holes formed therein which are adapted to register with each other and which are also adapted to register with the connection holes in a clip. In the past, one end of a first girt was positioned on a clip but was not initially connected to the clip. A second girt to be overlapped with respect to the previously positioned first girt was then positioned upon the end of the first girt and bolts were then inserted through the connection holes in the overlapped girts and the clip.

A problem apparently existed in the previous construction method in that the first girt positioned on the clip could become dislodged therefrom before the second girt could be secured to the previously positioned first girt and clip. OSHA has recently enacted a new regulation which states that in girt connections, when girts share common connection holes, at least one bolt with its wrench-tight nut shall remain connected to the first girt member unless a manufacturer-supplied, field-attached seat or similar connection device is present to secure the first girt member so that the first girt is always secured against displacement. A solution to the problem is not as simple as it may initially seem. For example, if a conventional bolt were inserted through a connection hole in the first girt and secured to the clip by means of a nut, the upwardly protruding head of the bolt would interfere with the placement of the second girt on the first girt. Further, it would be difficult, if not impossible, to remove the temporary bolt due to the fact that the second girt is positioned on top of the head of the temporary retaining bolt. It is for this reason that the instant invention and method have been devised. Although the above discusses the girt situation, the same problems exist with purlins.

SUMMARY OF THE INVENTION

A girt retainer is described which comprises a threaded shank having a disk-shaped head on one end thereof. The disk-shaped head is relatively thin so that it can be deformed upon sufficient tightening of the nut on the retainer when the retainer has been inserted downwardly through a connection hole in a first girt and through a connection hole in a clip secured to an upstanding column. The head of the girt also has one or more downwardly extending anti-rotation protrusions extending therefrom. Although the head is described as being disk-shaped, the head could be shaped otherwise such as conical, oval, etc.

The method of bolting the overlapping ends of first and second girts, which share common connection holes, to a clip, having connection holes formed therein which are common to the common connection holes in the overlapping ends of the first and second girts, which is secured to an upstanding frame or column and which extends substantially horizontally therefrom, is also described. The first method step is to position one end of the first girt with respect to the clip so that one end of the first girt rests thereon and so that the connection holes in the end thereof register with the connection holes in the clip. The girt retainer of this invention is extended downwardly through the connection hole in the first girt and the connection hole in the clip. A nut is then threadably mounted on the lower end of the girt retainer and finger tightened to temporarily but positively maintain one end of the girt on the clip. One end of a second girt is then positioned on top of the end of the first girt in an overlapping position therewith so that the connection holes therein register with the connection holes in the first girt and the connection holes in the clip. A conventional bolt is then extended downwardly through a connection hole in the second girt, a registering connection hole in the first girt and through a registering connection hole in the clip. A nut is then secured to the lower end of the conventional bolt to positively maintain the overlapping ends of the first and second girts on the clip. The nut on the girt retainer is then tightened which causes the relatively thin head of the girt retainer to deform, thereby enabling the head of the girt retainer to be pulled downwardly through the connection hole in the first girt and through the connection hole in the clip so that the girt retainer may be removed from the installation. The anti-rotation protrusions on the head of the girt retainer engage the first girt to prevent rotation of the girt retainer as the nut thereon is tightened. The overlapping ends of the first and second girts are then further secured to the clip by conventional bolts. The method described above may also be used during the installation of purlins on the roof frame members.

It is therefore a principal object of the invention to provide a girt retainer.

A further object of the invention is to provide a girt retainer for temporarily securing one end of a girt to a clip which extends from a column.

Yet another object of the invention is to provide a girt retainer which has a deformable head which enables the girt retainer to be removed from a first girt and the supporting clip after a second girt has been overlapped and secured to the first girt and the clip positioned therebelow.

Yet another object of the invention is to provide a method of bolting the overlapping ends of first and second girts or purlins together which prevents the first girt or purlin from becoming dislodged from a supporting clip or similar structure during the construction process.

These and other objects will be apparent to those skilled in the art.

DESCRIPTION OF THE PREFERRED EMBODIMENT AND METHOD

Figure 1:
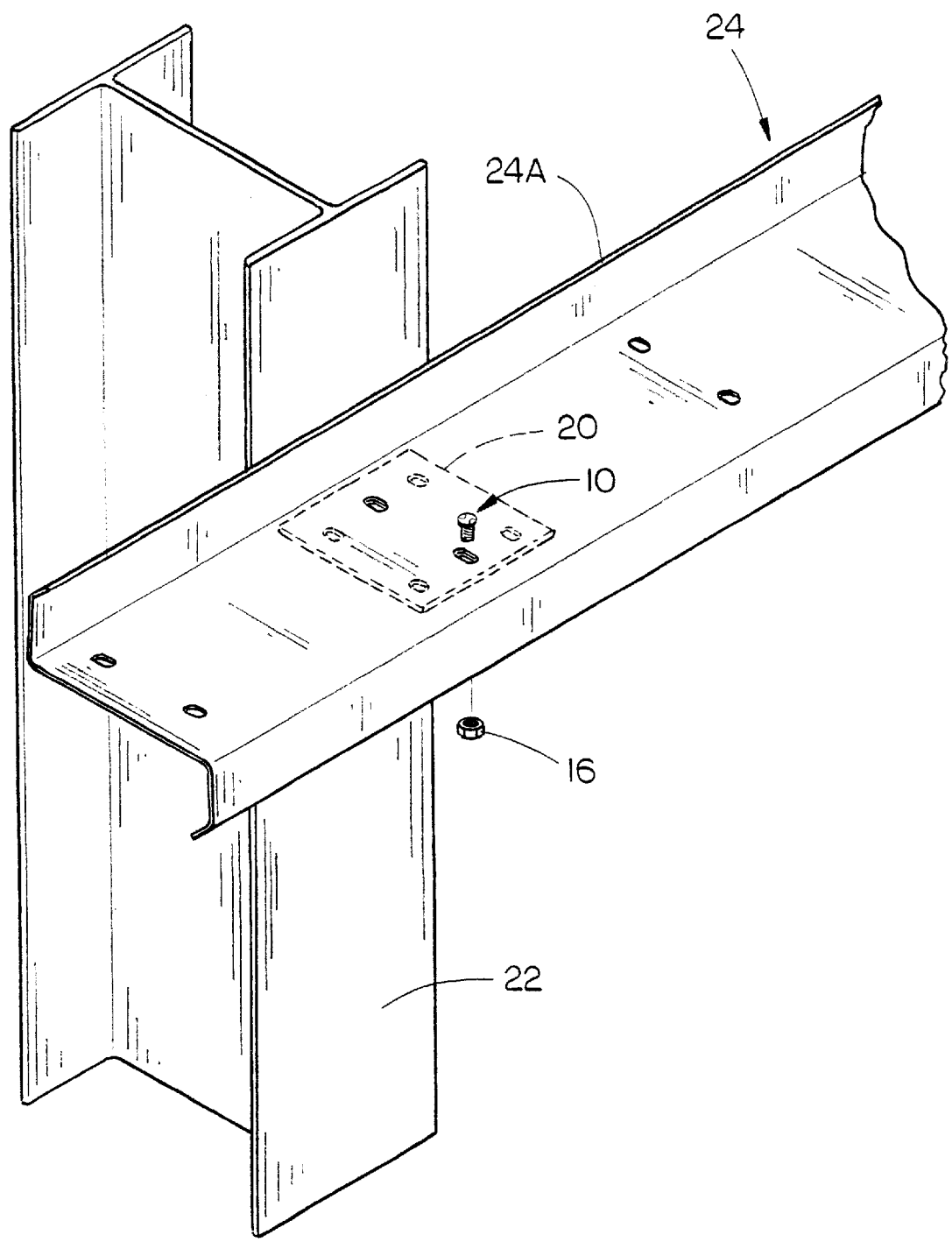
FIG. 1 is a perspective view illustrating one end of a first girt being positioned on a clip which extends from a column.

The girt retainer of this invention is referred to generally by the reference numeral 10 and comprises a threaded shank 12 and a generally disk-shaped head 14 on one end thereof. Although the head is shown to be disk-shaped, the head 14 could be conical, oval, etc. The numeral 16 refers to a nut for threadable mounting on the threaded shank 12. The head 14 includes one or more anti-rotation protrusions 18 which extend downwardly from the periphery of the head, as illustrated in the drawings. The thickness of the head 14 is relatively thin so that the head 14 may be subsequently deformed to enable the girt retainer 10 to be pulled downwardly through a connection hole in a girt and a connection hole in a supporting clip, as will be described in more detail hereinafter. It is preferred that the girt retainer 10 be constructed of metal, but it is conceivable that the girt retainer 10 could also be constructed of other materials such as plastic or the like.

The girt retainer 10 is designed to be used in those situations where ends of first and second girts are to be overlapped and not only secured together but secured to a clip 20 which is secured to the inner side of a column 22 such as commonly found in systems-engineered metal buildings. The girts 24 are generally "Z" or "C"-shaped members formed from sheet steel which span between the primary framing (columns 22) and supporting wall material. A metal building normally includes a plurality of the columns 22 which have a plurality of vertically spaced clips 20 secured to the inside surfaces thereof for supporting the wall material such as drywall, etc. Inasmuch as the girts 24 do not have a sufficient length to extend the entire length of the building, the girts 24 must be overlapped and not only secured together but also secured to the clips 20.

In the past, a first girt 24A would be positioned on the clip 20 but would not be secured thereto at that time. The end of a second girt 24B would then be positioned on top of the girt 24A in an overlapping position so that the connecting holes in the girts 24A and 24B and the connecting holes in the clip 20 are aligned or register. At that time, conventional bolts would be extended through the registering connecting holes to secure the overlapped ends of the girts 24A and 24B to the clip 20. However, as stated hereinbefore, OSHA now requires that the first girt 24A be initially secured to the clip 20 so that the first girt 24A is always secured against displacement. In an effort to overcome the problems associated with the new OSHA regulation, the girt retainer 10 of this invention has been devised as well as the method of securing the first girt 24A to the clip 20 against displacement until such time that the second girt 24B has been secured to the first girt 24A with those girts being secured to the clip 20.

Figure 1A:
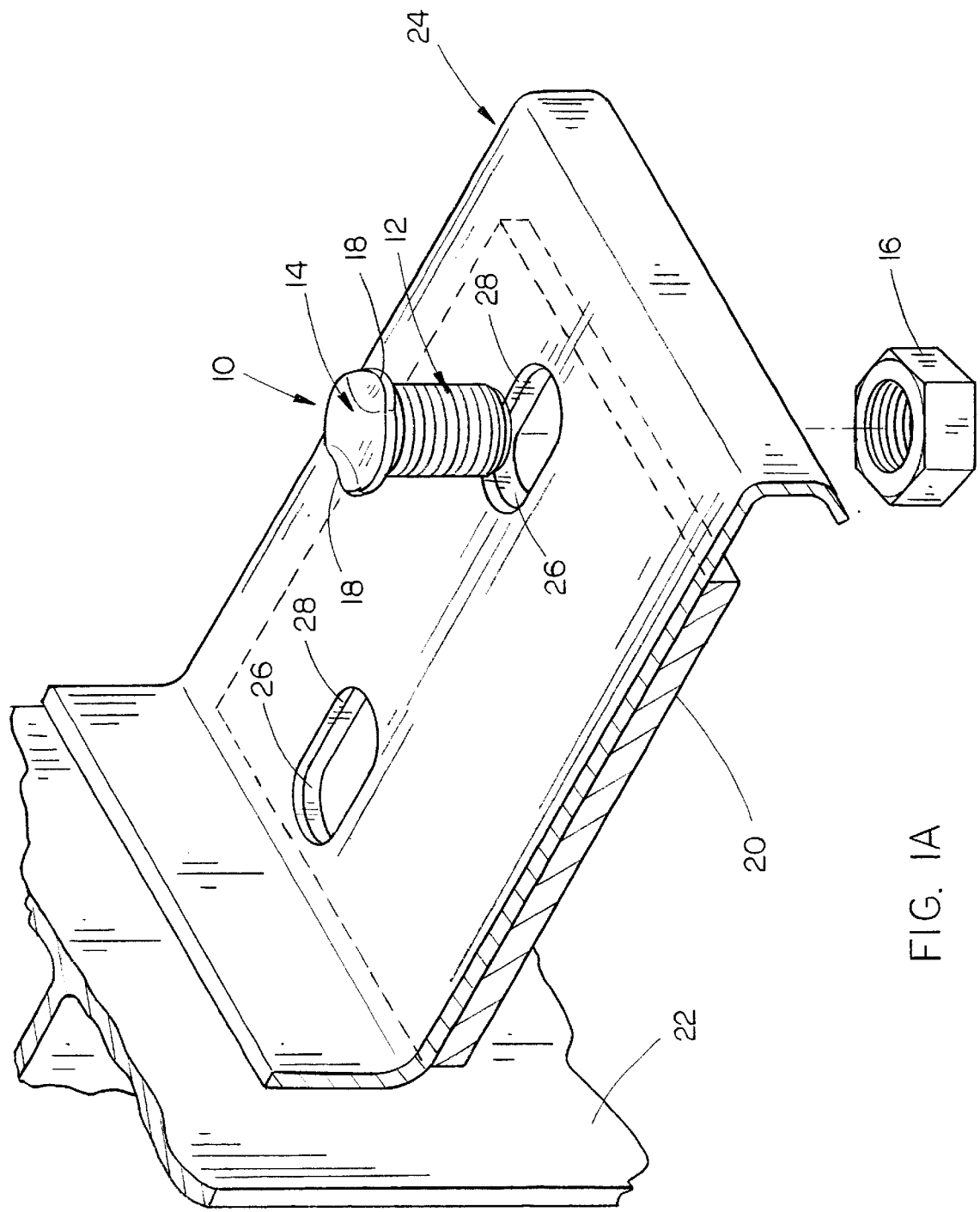
FIG. 1A is a partial perspective view illustrating the girt retainer of this invention being used to temporarily secure one end of a first girt to the clip.
Figure 2:
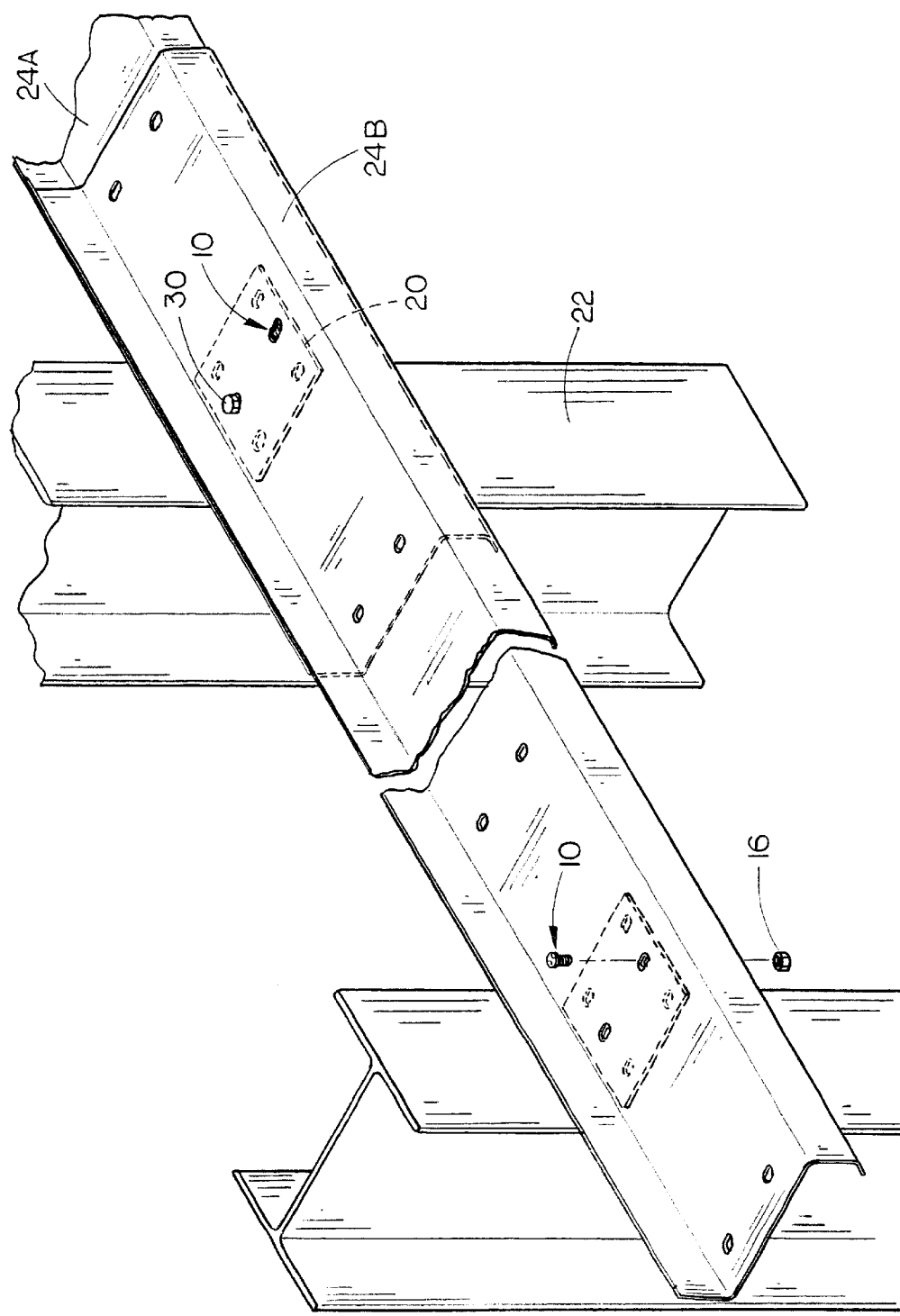
FIG. 2 is a partial perspective view illustrating one end of a second girt positioned on and secured to the first girt and supporting clip with the other end of the second girt being positioned on a supporting clip extending from another column.
Figure 2B:
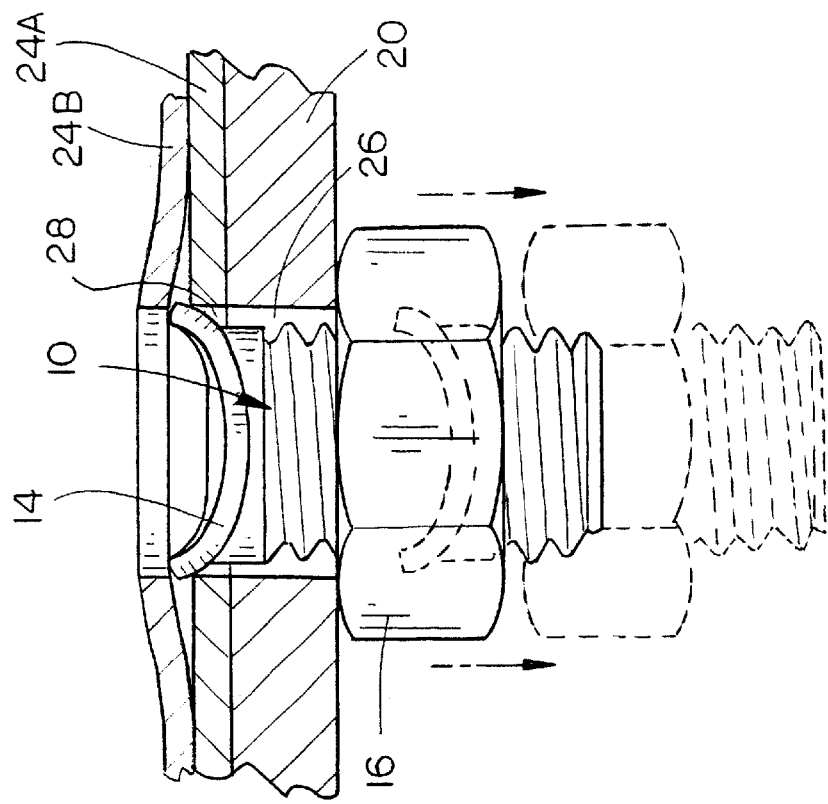
FIG. 2B is a sectional view similar to FIG. 2A except that the girt retainer is being pulled downwardly from the first girt and clip.
Figure 2A:
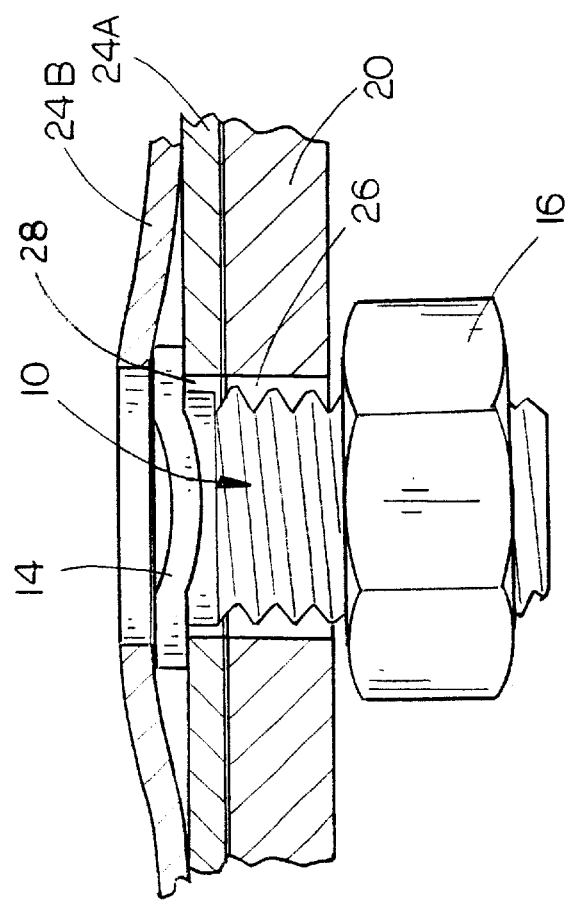
FIG. 2A is a sectional view as seen on lines 2—2 of FIG. 4.
Figure 3:
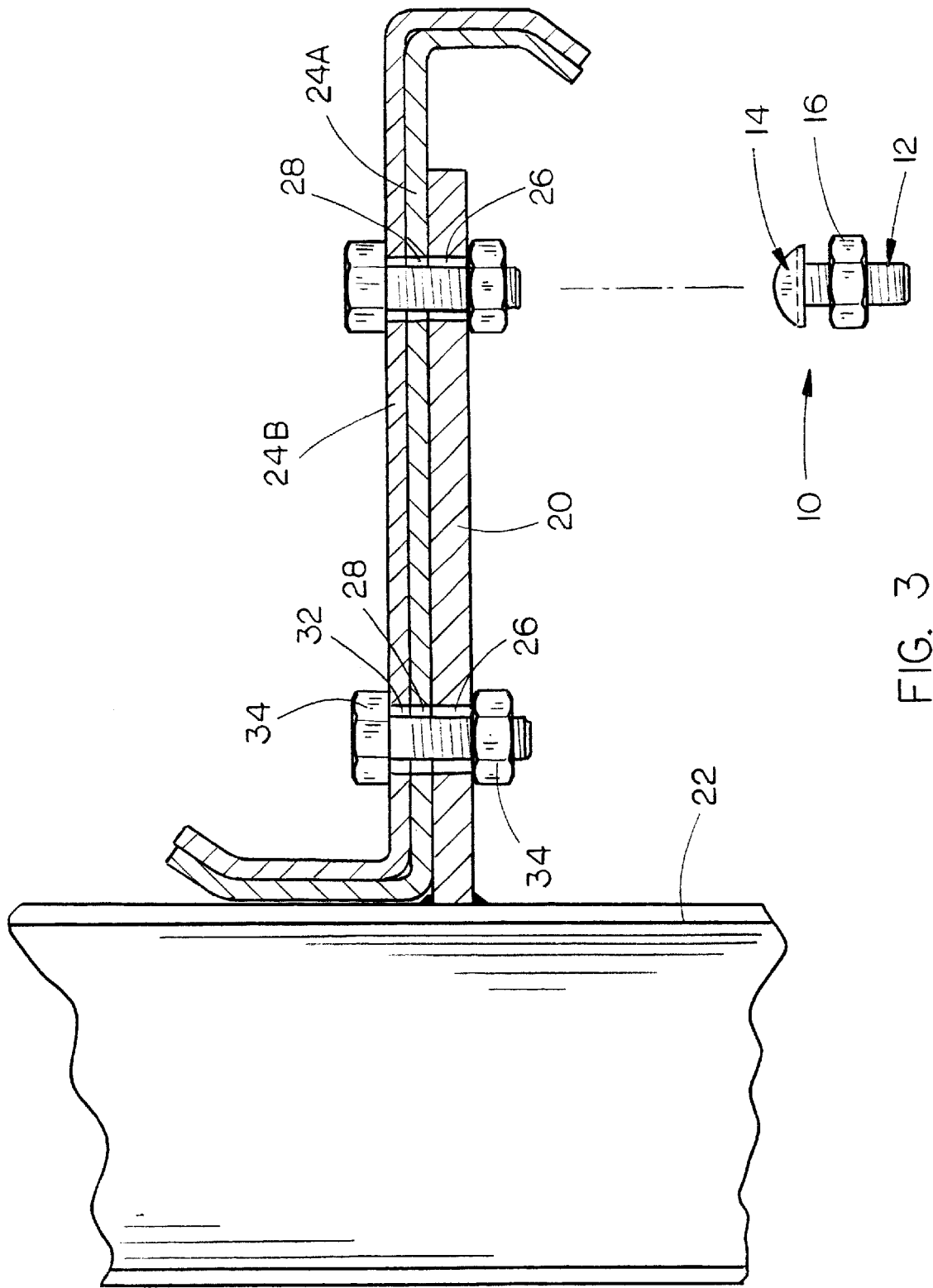
FIG. 3 is a sectional view as seen on lines 3—3 of FIG. 4.
Figure 4:
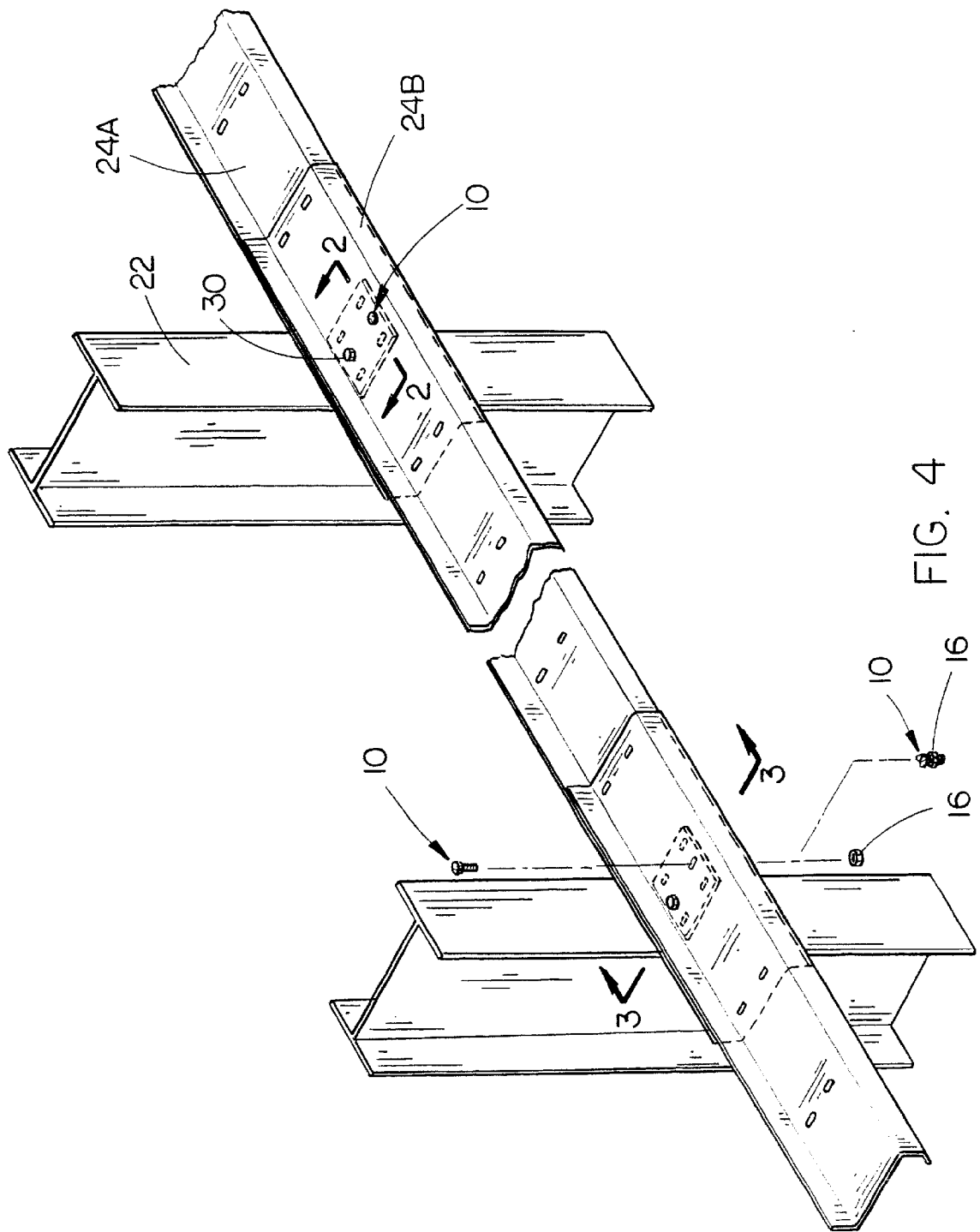
FIG. 4 is a partial perspective view illustrating the overlapping and securing method of this invention.

Assuming that the clip 20 has already been installed on the column 22, and has connection holes 26 formed therein, the method of this invention is as follows. One end of girt 24A is positioned on the clip 20 and the threaded shank 12 of girt retainer 10 is inserted downwardly through one of the connection openings 28 in girt 24 and inserted through a registering connection opening 26 in clip 20 (FIGS. 1 and 1A). Nut 16 is threadably mounted on the lower end of the threaded shank 12 and is finger tightened. Preferably, the downwardly extending anti-rotation protrusions 18 extend downwardly into connection opening 28 to prevent rotation of the girt retainer, as will be described hereinafter (FIG. 2A). The end of girt 24B which is to be overlapped on top of girt 24A is then positioned on top of the end of girt 24A which results in the head 14 of the girt retainer 10 being positioned between the girt retainers 24A and 24B (FIGS. 2, 2A). At that time, the other end of girt 24B is temporarily secured to another clip 20 by means of a girt retainer 10. A conventional bolt 30 is then inserted downwardly through a connection opening 32 in girt 24B, through a registering connection opening 28 in girt 24A and through a registering connection opening 26 in clip 20. A conventional nut 34 is then conventionally threadably mounted on the lower end of conventional bolt 30 which secures one end of the girt members 24A and 24B to the clip 20. Nut 16 is then threadably tightened on shank 12 of the girt retainer 10. As nut 16 is being tightened, the anti-rotational protrusions 18 engage the inner surfaces of the connection opening 28 in girt 24A so that the threaded shank will not rotate as the nut 16 is being tightened. The tightening of the nut 16 on girt retainer 10 draws the threaded shank 12 and head 14 downwardly, thereby causing the head 14 to deform, as illustrated in FIG. 2B, so that the deformed head 14 may be pulled downwardly through the connection opening 28 in girt 24A and through the connection opening 26 in clip 20 so that the girt retainer 10 may be completely removed from the girt 24A and clip 20. The overlapping ends of the girts 24A and 24B are then further secured together by conventional bolts, as illustrated in the drawings. The outer end of girt 24B is then overlapped with another girt and the connection process is continued as described above.

Although the retainer is ideally suited for use during the installation of girts, the retainer could be used during the installation of purlins. Although it is preferred that the head of the retainer have the anti-rotation protrusions 18, the head of the retainer may be substantially flat in some embodiments.

Thus it can be seen that a novel girt retainer has been provided for securing a first girt to a column clip until a second girt has been overlapped onto the first girt and the first and second girts secured to the column clip. Applicants' girt retainer and the method of using the same ensures that the first girt is always secured against displacement until both of the girts have been securely connected to the column clip.

Thus it can be seen that the invention accomplishes at least all of its stated objectives.

We claim:

1. A retainer for temporarily securing a girt, having connection holes formed therein, to a clip, having connection holes therein, which is secured to an upstanding frame and which extends substantially horizontally therefrom, comprising:

a threaded shank having upper and lower ends;

a deformable head on said upper end of said threaded shank; and said threaded shank being receivable by a connection hole in the girt and a connection hole in the clip whereby said head is positioned above said girt;

a threaded nut for threadable attachment to said threaded shank- below the clip whereby the retainer temporarily secures the girt to the clip;

said head being deformable to permit said head to be pulled downwardly completely through the connection hole in the girt and the connection hole in the clip upon said threaded nut being sufficiently tightened on said shank to remove the retainer from the girt and clip.

2. The retainer of claim 1 wherein said head has a diameter which is greater than the diameter of the connection hole in the girt.

3. The retainer of claim 1 wherein said head is generally disk-shaped.

4. The retainer of claim 2 wherein said head has at least one anti-rotation protrusion extending downwardly therefrom for engagement with the girt to prevent the rotation of said head and said threaded shank when said threaded nut is threadably tightened.

5. The retainer of claim 1 wherein said head has a thickness such that it will deform upon sufficient tightening of the nut when the shank of the retainer has been inserted downwardly through a connection hole in the girt and a connection hole in the clip and the nut has been threadably mounted on the shank below the clip, to permit said head to be pulled downwardly completely through the connection hole in the girt and the connection hole in the clip.

6. A retainer for temporarily securing a purlin, having connection holes formed therein, to a clip, having connection holes therein, which is secured to a frame and which extends therefrom, comprising:

a threaded shank having upper and lower ends;

a deformable head on said upper end of said threaded shank; and said threaded shank being receivable by a connection hole in the purlin and a connection hole in the clip whereby said head is positioned above said purlin;

a threaded nut for threadable attachment to said threaded shank below the clip whereby the retainer temporarily secures the purlin to the clip;

said head being deformable to permit said head to be pulled downwardly completely through the connection hole in the purlin and the connection hole in the clip upon said threaded nut being sufficiently tightened on said shank to remove the retainer from the purlin and clip.

7. The retainer of claim 6 wherein said head has a diameter which is greater than the diameter of the connection hole in the purlin.

8. The retainer of claim 6 wherein said head is generally disk-shaped.

9. The retainer of claim 7 wherein said head has at least one anti-rotation protrusion extending downwardly therefrom for engagement with the purlin to prevent the rotation of said head and said threaded shank when said threaded nut is threadably tightened.

10. The retainer of claim 6 wherein said head has a thickness such that it will deform upon sufficient tightening of the nut when the shank of the retainer has been inserted through a connection hole in the purlin and a connection hole in the clip and the nut has been threadably mounted on the shank below the clip, to permit said head to be pulled downwardly completely through the connection hole in the purlin and the connection hole in the clip.

* * * * *